(12) United States Patent
Carlsson

(10) Patent No.: US 11,821,650 B2
(45) Date of Patent: Nov. 21, 2023

(54) DEHUMIDIFICATION SYSTEM AND METHOD

(71) Applicant: MUNTERS EUROPE AB, Kista (SE)

(72) Inventor: Magnus Carlsson, Vallentuna (SE)

(73) Assignee: MUNTERS EUROPE AB, Kista (SE)

( * ) Notice: Subject to any disclaimer, the term of this patent is extended or adjusted under 35 U.S.C. 154(b) by 855 days.

(21) Appl. No.: 16/765,503

(22) PCT Filed: Nov. 8, 2018

(86) PCT No.: PCT/EP2018/080653
§ 371 (c)(1),
(2) Date: May 20, 2020

(87) PCT Pub. No.: WO2019/101542
PCT Pub. Date: May 31, 2019

(65) Prior Publication Data
US 2023/0221014 A1    Jul. 13, 2023

(51) Int. Cl.
*F24F 3/14*        (2006.01)
*B01D 53/26*      (2006.01)
(Continued)

(52) U.S. Cl.
CPC ............ *F24F 3/1423* (2013.01); *B01D 53/06* (2013.01); *B01D 53/261* (2013.01);
(Continued)

(58) Field of Classification Search
CPC .......... F24F 3/1423; F24F 11/81; F24F 11/86; F24F 2003/1458; F24F 2203/02; B01D 53/06
See application file for complete search history.

(56) References Cited

U.S. PATENT DOCUMENTS

| 6,029,467 A | 2/2000 | Moratalla |
| 8,551,230 B2 * | 10/2013 | Caggiano ............ B01D 53/002 96/125 |

(Continued)

FOREIGN PATENT DOCUMENTS

| CN | 101 672 502 A | 3/2010 |
| CN | 104 515 214 A | 9/2017 |

(Continued)

OTHER PUBLICATIONS

European Patent Office "International Search Report" from corresponding International Application No. PCT/EP2018/080653, 4 pp., dated Feb. 15, 2019.

*Primary Examiner* — Jon T. Schermerhorn, Jr.
(74) *Attorney, Agent, or Firm* — Eckert Seamans Cherin & Mellott, LLC

(57) ABSTRACT

The invention relates to a process air dehumidification system (2) comprising a process air dehumidifier unit (4) comprising a moisture absorbing agent (6), the process air dehumidification system (2) further comprising a moisture absorbing agent regeneration system (8) comprising a closed regeneration air loop (10) arranged to pass through the process air dehumidifier unit (4) and comprising regeneration air flow generating means (12) for generating a regeneration air flow (14) in the closed regeneration air loop (10) and comprising a heat pump (16) comprising a condenser (18) and an evaporator (20) and a heat pump refrigerant (22), where the closed regeneration air loop (10) is arranged to pass through the condenser (18) and the evaporator (20) to exchange heat between regeneration air (24) and heat pump refrigerant (22), where the dehumidification system (2) comprises a complementary regeneration air moisture removal system (26) arranged downstreams of the evaporator (20) and upstreams of the condenser (18) and a regeneration air heat bypass system (28) arranged to exchange (Continued)

heat from inlet regeneration air (30) upstreams of the dehumidifier unit (4) and downstreams of the condenser (18) to outlet regeneration air (32) downstreams of the dehumidifier unit (4) and upstreams of the evaporator (20) and means (34) arranged to activate and deactivate the complementary regeneration air moisture removal system (26) and the regeneration air heat bypass system (28). The invention also relates to a method for dehumidification of process air.

20 Claims, 3 Drawing Sheets

(51) Int. Cl.
*F24F 11/81* (2018.01)
*F24F 11/86* (2018.01)
*F24F 11/89* (2018.01)
*B01D 53/06* (2006.01)

(52) U.S. Cl.
CPC ............ *B01D 53/263* (2013.01); *F24F 11/81* (2018.01); *F24F 11/86* (2018.01); *F24F 11/89* (2018.01); *B01D 2253/106* (2013.01); *B01D 2259/4508* (2013.01); *B01D 2259/65* (2013.01); *F24F 2003/144* (2013.01); *F24F 2003/1458* (2013.01); *F24F 2203/02* (2013.01); *F24F 2203/021* (2013.01); *F24F 2203/1016* (2013.01); *F24F 2203/1036* (2013.01)

(56) References Cited

U.S. PATENT DOCUMENTS

| | | | |
|---|---|---|---|
| 9,810,439 B2 * | 11/2017 | Coutu | F24F 3/147 |
| 10,948,202 B2 * | 3/2021 | Lee | F24F 3/153 |
| 11,143,430 B2 * | 10/2021 | Ghadiri Moghaddam | F24F 13/30 |
| 11,408,681 B2 * | 8/2022 | LePoudre | F28D 5/02 |
| 11,598,534 B2 * | 3/2023 | Coutu | F24F 3/1417 |
| 2021/0396422 A1 * | 12/2021 | Ghadiri Moghaddam | H05K 7/20745 |

FOREIGN PATENT DOCUMENTS

| | | |
|---|---|---|
| JP | S61 257218 A | 11/1986 |
| JP | S62 180720 A | 8/1987 |

* cited by examiner

DEHUMIDIFICATION SYSTEM AND METHOD

CROSS-REFERENCE TO RELATED APPLICATIONS

This application claims the benefit of priority to International Application No. PCT/EP2018/080653, entitled "DEHUMIDIFICATION AND METHOD", filed on Nov. 8, 2018, which claims the benefit of priority from Swedish Application No. 1751436-5, filed on Nov. 22, 2017, the contents of each are incorporated herein by reference.

TECHNICAL FIELD

The present invention relates to a dehumidification system, and to a method of dehumidifying process air according to the preamble of claims 1 and 15.

BACKGROUND

In many different fields of industry such as e.g. agriculture, automotive, chemical processing etc. it is important to keep the relative humidity of the atmosphere or process air, e.g. of the air enclosed in or fed into a space such as e.g. a storage room, a production facility, a data center etc. within specified limits in order to prevent unwanted effects such as corrosion, electrical failures, bacterial growth etc.

One way of achieving this is to remove process air from the space and reintroduce the process air and/or introduce new process air into the space via a dehumidifier which removes excess moisture from the process air.

Dehumidifiers can e.g. absorb moisture from process air using a moisture absorbing agent in the dehumidifier. For a continuous dehumidification of the process air, moisture has also to be removed continuously from the moisture absorbing agent.

One example of dehumidifiers having a moisture absorbing agent which absorbs moisture from process air whereafter the moisture absorbing agent is regenerated are dehumidifiers with desiccant rotors, where the desiccant is e.g. silica gel. Here, a rotor with a desiccant is arranged to rotate slowly in two separated air streams, one process air stream releasing moisture to the desiccant and one regeneration air stream removing moisture from the desiccant.

Further, if the regeneration air is to be reused for drying the desiccant, moisture also has to be removed from the regeneration air in turn. This can be done by cooling the regeneration air, whereby moisture condensates from the regeneration air and can be removed, and thereafter reheating the regeneration air before reuse thus enabling the regeneration air to collect more moisture from a moisture absorbing agent.

Using a heat pump is one possible way of drying and heating regeneration air.

JPS 62 180 720 A shows a heat pump for heating and cooling of regeneration air.

In areas such as e.g. the nordic countries—e.g. Sweden, Canada and northern parts of Russia, with varying outdoor air temperature and outdoor air moisture content, and thus similar varying process air properties with sometimes high heat demand for processing regeneration air, heat pumps have not been used as primary heat sources for dehumidification units and processing of regeneration air as heat pumps have had to be shut off for long periods of time at regeneration air conditions exceeding the limits that the heat pump can operate in. A high heat demand restricts the number of available operating hours for a heat pump. In such conditions, where e.g. electrical direct heaters have to be used for long periods of time as the conditions are too harsh for heat pumps, it has not been commercially attractive to install a heat pump as the primary heat source for a dehumidification unit.

The invention solves the problem of running a heat pump as the primary heat source for a dehumidification unit at varying process air temperature and moisture content.

SUMMARY OF THE INVENTION

The problem of running a heat pump as the primary heat source for a dehumidification unit at varying process air temperature and moisture content is solved by a process air dehumidification system comprising a process air dehumidifier unit comprising a moisture absorbing agent and a closed regeneration air loop arranged to pass through the process air dehumidifier unit and a heat pump comprising a condenser and an evaporator to exchange heat between regeneration air and heat pump refrigerant, comprising a complementary regeneration air moisture removal system arranged downstreams of the evaporator and upstreams of the condenser and a regeneration air heat bypass system arranged to exchange heat from inlet regeneration air upstreams of the dehumidifier unit and downstreams of the condenser to outlet regeneration air downstreams of the dehumidifier unit and upstreams of the evaporator and means arranged to activate and deactivate the complementary regeneration air moisture removal system and the regeneration air heat bypass system according to the characterizing portion of claim 1, and a method of dehumidifying process air comprising the steps of operating the dehumidification system with an activated complementary regeneration air moisture removal system and a de-activated regeneration air heat bypass system when the dehumidifier unit process air dewatering rate requires more heat than the design capacity of the heat pump, and operating the dehumidification system with a de-activated complementary regeneration air moisture removal system and an activated regeneration air heat bypass system when the dehumidifier unit process air dewatering rate requires less heat than the design capacity of the heat pump according the characterizing portion of claim 15.

By that a process air dehumidification system comprising a process air dehumidifier unit comprising a moisture absorbing agent and a closed regeneration air loop arranged to pass through the process air dehumidifier unit and a heat pump comprising a condenser and an evaporator to exchange heat between regeneration air and heat pump refrigerant, comprising a complementary regeneration air moisture removal system arranged downstreams of the evaporator and upstreams of the condenser and a regeneration air heat bypass system arranged to exchange heat from inlet regeneration air upstreams of the dehumidifier unit and downstreams of the condenser to outlet regeneration air downstreams of the dehumidifier unit and upstreams of the evaporator and means arranged to activate and deactivate the complementary regeneration air moisture removal system and the regeneration air heat bypass system, is obtained the advantage of that the heat pump operating time can be increased whereby electrical energy is saved compared to running a conventional heat pump heater or a direct heater. Further, more of the available waste heat can be utilized and the temperature of the heat delivered to the regeneration air can be increased. Thus, heat pumps can be made available as heat sources for dehumidification units located at places where the process air conditions are varying, either due to seasons or other reasons for variations in the process air conditions.

By that the method of dehumidifying process air comprising the steps of operating the dehumidification system with an activated complementary regeneration air moisture removal system and a de-activated regeneration air heat bypass system when the dehumidifier unit process air dewatering rate requires more heat than the design capacity of the heat pump, and operating the dehumidification system with a de-activated complementary regeneration air moisture removal system and an activated regeneration air heat bypass system when the dehumidifier unit process air dewatering rate requires less heat than the design capacity of the heat pump, is obtained the advantage of that the heat pump operating time can be increased whereby electrical energy is saved compared to running a conventional heat pump heater or a direct heater. Further, more of the available waste heat can be utilized and the temperature of the heat delivered to the regeneration air can be increased. Thus, heat pumps can be made available as heat sources for dehumidification units located at places where the process air conditions are varying, either due to seasons or other reasons for variations in the process air conditions.

According to one aspect of the invention, the complementary regeneration air moisture removal system comprises at least one supply air inlet and at least one air ventilation outlet arranged in the closed regeneration air loop, where the at least one supply air inlet is arranged upstream of the at least one air ventilation outlet, and further comprises regulating means for regulating a supply air flow and regulating means for regulating air ventilation flow. Thus is obtained the advantage that surplus moisture may be ventilated to maintain stable operating conditions for the heat pump at high process air dewatering rates.

According to one aspect of the invention, the regulating means are motor controlled dampers. Thus is obtained the advantage that the operating conditions of the heat pump may be automatically controlled to increase the uptime of the heat pump.

According to one aspect of the invention, the means arranged to activate and deactivate the complementary regeneration air moisture removal system is a moisture indicator and control device arranged to measure moisture content in the regeneration air flow downstreams of the complementary regeneration air moisture removal system and arranged to control the regulating means in response to the measured moisture content in the regeneration air. Thus is obtained the advantage that a constant dew point at the evaporator may be obtained.

According to one aspect of the invention, the moisture absorbing agent regeneration system comprises a complementary heater arranged to heat supply air. Thus is obtained the advantage that condensation when adding potentially cold supply air is avoided.

According to one aspect of the invention, the means arranged to activate and deactivate the complementary heater is a complementary temperature indicator and control device arranged to measure the temperature of the supply air flow downstreams of the further complementary heater and arranged to control the operation of the complementary heater in response to the measured temperature in the supply air. Thus is obtained the advantage that the elimination of the risk of condensation may be automatically controlled.

According to one aspect of the invention, the complementary regeneration air moisture removal system comprises at least one sub-cooler where the closed regeneration air loop is arranged to pass through the sub-cooler. Thus is obtained the advantage that surplus moisture is removed to maintain stable operating conditions for the heat pump at high process air dewatering rates.

According to one aspect of the invention, the means arranged to activate and deactivate the complementary regeneration air moisture removal system is a moisture indicator and control device arranged to measure moisture content in the regeneration air flow downstreams of the complementary regeneration air moisture removal system and arranged to activate or de-activate the sub-cooler in response to the measured moisture content. Thus is obtained the advantage that a constant dew point at the evaporator may be obtained.

According to one aspect of the invention, the regeneration air heat bypass system comprises a heat exchanger for heat absorbation from inlet regeneration air and a heat exchanger for heat discharge to outlet regeneration air, a closed refrigerant loop connecting the heat exchangers, a refrigerant and a refrigerant pump. Thus is obtained the advantage that the heat supply to the evaporator of the heat pump may be obtained also at lower process air dewatering rates.

According to one aspect of the invention, the means arranged to activate and deactivate the complementary regeneration air heat bypass system is a temperature indicator and control device arranged to measure temperature of the regeneration air flow downstreams of the evaporator and arranged to control the operation of the refrigerant pump in response to the measured temperature. Thus is obtained the advantage that the need of air heat bypass may be continuously monitored and controlled as the process air dewatering rate is reduced.

According to one aspect of the invention, the regeneration air heat bypass system comprises a heat exchanger arranged for heat absorbation from inlet regeneration air and for heat discharge to outlet regeneration air where said heat exchanger is arranged in the closed regeneration air loop downstreams of the dehumidifier unit and where an inlet regeneration air bypass loop is arranged to pass through said heat exchanger, where further dampers in the inlet regeneration air bypass loop and in the closed regeneration air loop are arranged to control the amount of regeneration air flow through the inlet regeneration air bypass loop. Thus is obtained the advantage that the heat supply to the evaporator of the heat pump may be obtained also at lower process air dewatering rates.

According to one aspect of the invention, the moisture absorbing agent regeneration system comprises a complementary heater arranged to heat regeneration air downstreams of the condenser and upstreams of the dehumidifier unit. Thus is obtained the advantage that the heat pump does not need to be designed for the extreme ambient conditions but rather for the most suitable conditions to save maximum electrical energy.

According to one aspect of the invention, the means arranged to activate and deactivate the complementary heater is a complementary temperature indicator and control device arranged to measure the temperature of the regeneration air flow downstreams of the complementary heater and arranged to control the operation of the complementary heater in response to the measured temperature. Thus is obtained the advantage that it is possible to use the same control strategy of regeneration air temperature control for units with heat pumps as for units without heat pumps.

According to one aspect of the invention, the heat pump comprises at least a compressor and an expansion valve.

According to one aspect of the invention, the dehumidification method further comprises the step of operating the dehumidification system with a de-activated complementary regeneration air moisture removal system and a de-activated regeneration air heat bypass system when the dehumidifier unit process air dewatering rate requires the heat equal to the design capacity of the heat pump. Thus is obtained the advantage that the maximum efficiency of the heat pump is obtained.

BRIEF DESCRIPTION OF DRAWINGS

The invention will be described more in detail referring to the attached drawings, where.

DESCRIPTION OF PREFERRED EMBODIMENTS

Figure 1:
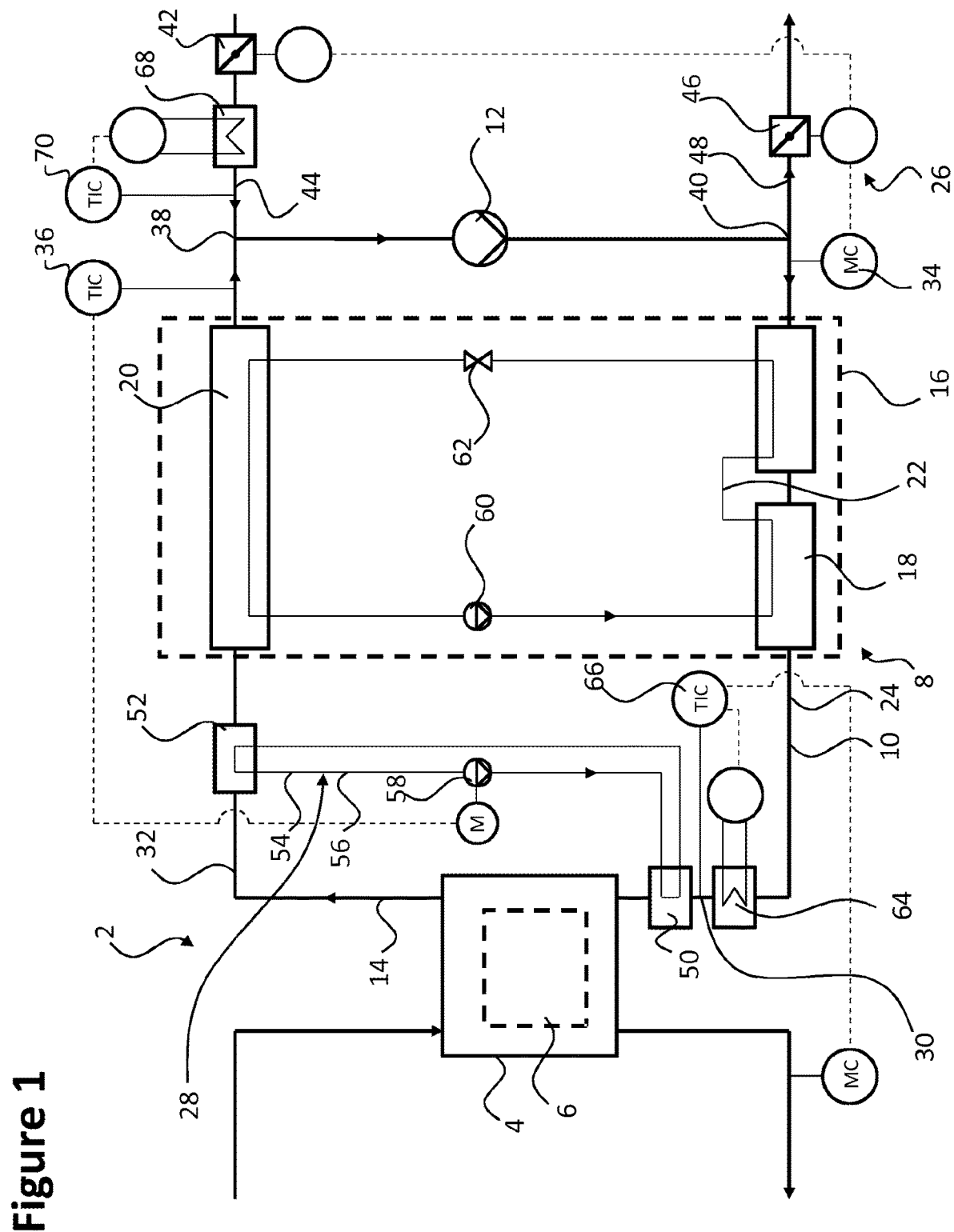
FIG. 1 shows schematically a dehumidification system according to a first embodiment of the invention.

FIG. 1 shows schematically a process air dehumidification system 2 comprising a process air dehumidifier unit 4 comprising a moisture absorbing agent 6, the process air dehumidification system 2 further comprising a moisture absorbing agent regeneration system 8 comprising a closed regeneration air loop 10 arranged to pass through the process air dehumidifier unit 4 and comprising regeneration air flow generating means 12 for generating a regeneration air flow 14 in the closed regeneration air loop 10 and comprising a heat pump 16 comprising a condenser 18 and an evaporator 20 and a heat pump refrigerant 22, where the closed regeneration air loop 10 is arranged to pass through the condenser 18 and the evaporator 20 to exchange heat between regeneration air 24 and heat pump refrigerant 22, where the dehumidification system 2 comprises a complementary regeneration air moisture removal system 26 arranged downstreams of the evaporator 20 and upstreams of the condenser 18 and a regeneration air heat bypass system 28 arranged to exchange heat from inlet regeneration air 30 upstreams of the dehumidifier unit 4 and downstreams of the condenser 18 to outlet regeneration air 32 downstreams of the dehumidifier unit 4 and upstreams of the evaporator 20 and means 34, 36 arranged to activate and deactivate the complementary regeneration air moisture removal system 26 and the regeneration air heat bypass system 28.

According to the embodiment shown in FIG. 1, the complementary regeneration air moisture removal system 26 arranged downstreams of the evaporator 20 and upstreams of the condenser 18 comprises at least one supply air inlet 38 and at least one air ventilation outlet 40 arranged in the closed regeneration air loop 10, where the at least one supply air inlet 38 is arranged upstream of the at least one air ventilation outlet 40, and further comprises regulating means 42 for regulating a supply air flow 44 and regulating means 46 for regulating air ventilation flow 48.

The regulating means 42, 46 can e.g. be motor controlled dampers, i.e. valves or plates that regulate the flow of air, and the means 34 arranged to activate and deactivate the complementary regeneration air moisture removal system 26 can be a moisture indicator and control device arranged to measure moisture content in the regeneration air flow downstreams of the complementary regeneration air moisture removal system 26 and arranged to control the motor controlled dampers in response to the measured moisture content in the regeneration air.

According to the embodiment shown in FIG. 1, the regeneration air heat bypass system 28 arranged to exchange heat from inlet regeneration air 30 upstreams of the dehumidifier unit 4 and downstreams of the condenser 18 to outlet regeneration air 32 downstreams of the dehumidifier unit 4 and upstreams of the evaporator 20 comprises a heat exchanger 50 for heat absorbation from inlet regeneration air 30 and a heat exchanger 52 for heat discharge to outlet regeneration air 32, a closed refrigerant loop 54 connecting the heat exchangers 50, 52, a refrigerant 56 and a refrigerant pump 58.

The means 36 arranged to activate and deactivate the regeneration air heat bypass system 28 can be a temperature indicator and control device arranged to measure temperature of the regeneration air flow downstreams of the evaporator 20 and arranged to control the operation of the refrigerant pump in response to the measured temperature in the regeneration air, i.e. to start the refrigerant pump in order to exchange heat from inlet regeneration air 30 upstreams of the dehumidifier unit 4 and downstreams of the condenser 18 and to use this heat to heat up outlet regeneration air 32 downstreams of the dehumidifier unit 4 and upstreams of the evaporator 20, or to stop the refrigerant pump.

In FIG. 1 the heat pump is exemplified with a compression heat pump. If a compression heat pump is used, the heat pump 16 further comprises at least a compressor 60 and an expansion valve 62 as is shown in FIG. 1. If on the other hand an absorption heat pump is used, the heat pump does not comprise any expansion valve.

As is further shown in FIG. 1, the moisture absorbing agent regeneration system 8 may optionally comprise a complementary heater 64 arranged to heat regeneration air downstreams of the condenser 18 and upstreams of the dehumidifier unit 4. The means 66 arranged to activate and deactivate the complementary heater 64 can be a complementary temperature indicator and control device arranged to measure the temperature of the regeneration air flow downstreams of the complementary heater 64 and arranged to control the operation of the complementary heater 64 in response to the measured temperature in the regeneration air, e.g. to steplessly control the amount of heat effect added from the complementary heater 64 to the regeneration air flow.

As is further shown in FIG. 1, the moisture absorbing agent regeneration system 8 may optionally comprise a further complementary heater 68 arranged to heat supply air 44. The means 70 arranged to activate and deactivate the further complementary heater 68 can be a complementary temperature indicator and control device arranged to measure the temperature of the supply air flow downstreams of the further complementary heater 68 and arranged to control the operation of the complementary heater 68 in response to the measured temperature in the supply air, e.g. to steplessly control the amount of heat effect added from the further complementary heater 68 to the supply air flow.

The regeneration air flow generating means 12 for generating a regeneration air flow 14 in the closed regeneration air loop 10 can be a fan.

Figure 2:
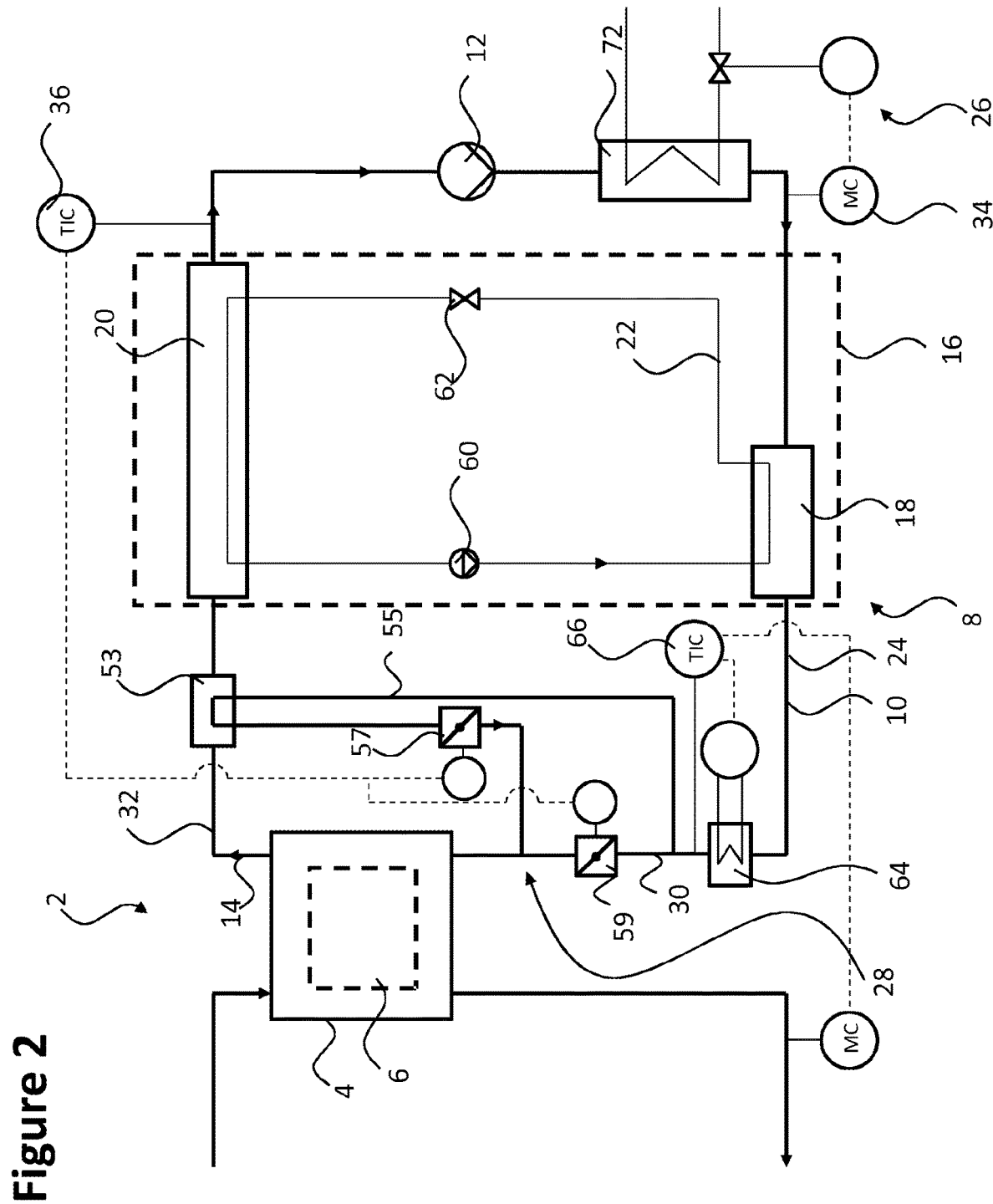
FIG. 2 shows schematically a dehumidification system according to a second embodiment of the invention.

FIG. 2 shows schematically a process air dehumidification system 2 comprising a process air dehumidifier unit 4 comprising a moisture absorbing agent 6, the process air dehumidification system 2 further comprising a moisture absorbing agent regeneration system 8 comprising a closed regeneration air loop 10 arranged to pass through the process air dehumidifier unit 4 and comprising regeneration air flow generating means 12 for generating a regeneration air flow 14 in the closed regeneration air loop 10 and comprising a heat pump 16 comprising a condenser 18 and an evaporator 20 and a heat pump refrigerant 22, where the closed regeneration air loop 10 is arranged to pass through the condenser 18 and the evaporator 20 to exchange heat between regeneration air 24 and heat pump refrigerant 22, where the dehumidification system 2 comprises a complementary regeneration air moisture removal system 26 arranged downstreams of the evaporator 20 and upstreams of the condenser 18 and a regeneration air heat bypass system 28 arranged to exchange heat from inlet regeneration air 30 upstreams of the dehumidifier unit 4 and downstreams of the condenser 18 to outlet regeneration air 32 downstreams of the dehumidifier unit 4 and upstreams of the evaporator 20 and means 34, 36 arranged to activate and deactivate the complementary regeneration air moisture removal system 26 and the regeneration air heat bypass system 28.

According to the embodiment shown in FIG. 2, the complementary regeneration air moisture removal system 26 arranged downstreams of the evaporator 20 and upstreams of the condenser 18 comprises at least one sub-cooler 72 where the closed regeneration air loop 10 is arranged to pass through the sub-cooler 72, and where the means 34 arranged to activate and deactivate the complementary regeneration air moisture removal system 26 can be a moisture indicator and control device arranged to measure moisture content in the regeneration air flow downstreams of the complementary regeneration air moisture removal system 26 and arranged to activate or de-activate the sub-cooler 72 in response to the measured moisture content in the regeneration air. In the figure, the sub-cooler 72 is shown arranged downstreams of the regeneration air flow generating means 12, the sub-cooler 72 can optionally be arranged upstreams of the regeneration air flow generating means 12.

According to the embodiment shown in FIG. 2, the regeneration air heat bypass system 28 arranged to exchange heat from inlet regeneration air 30 upstreams of the dehumidifier unit 4 and downstreams of the condenser 18 to outlet regeneration air 32 downstreams of the dehumidifier unit 4 and upstreams of the evaporator 20 comprises a heat exchanger 53 arranged for heat absorbation from inlet regeneration air 30 and for heat discharge to outlet regeneration air 32 where said heat exchanger 53 is arranged in the closed regeneration air loop 10 downstreams of the dehumidifier unit 4 and where an inlet regeneration air bypass loop 55 is arranged to pass through said heat exchanger 53, where further dampers 57, 59 in the inlet regeneration air bypass loop 55 and in the closed regeneration air loop 10 are arranged to control the amount of regeneration air flow through the inlet regeneration air bypass loop 55.

The means 36 arranged to activate and deactivate the regeneration air heat bypass system 28 can be a temperature indicator and control device arranged to measure the temperature of the regeneration air flow downstreams of the evaporator 20 and arranged to control the operation of the dampers 57, 59 in response to the measured temperature in the regeneration air, i.e. to open the damper 57 in the inlet regeneration air bypass loop 55 and to close the damper 59 in the closed regeneration air loop 10 in order to exchange heat from inlet regeneration air 30 upstreams of the dehumidifier unit 4 and downstreams of the condenser 18 and to use this heat to heat up outlet regeneration air 32 downstreams of the dehumidifier unit 4 and upstreams of the evaporator 20, or to close the damper 57 in the inlet regeneration air bypass loop 55 and to open the damper 59 in the closed regeneration air loop 10.

In FIG. 2 the heat pump is exemplified with a compression heat pump. If a compression heat pump is used, the heat pump 16 further comprises at least a compressor 60 and an expansion valve 62 as is shown in FIG. 2. If on the other hand an absorption heat pump is used, the heat pump does not comprise any expansion valve.

As is further shown in FIG. 2, the moisture absorbing agent regeneration system 8 may optionally comprise a complementary heater 64 arranged to heat regeneration air downstreams of the condenser 18 and upstreams of the dehumidifier unit 4. The means 66 arranged to activate and deactivate the complementary heater 64 can be a complementary temperature indicator and control device arranged to measure the temperature of the regeneration air flow downstreams of the complementary heater 64 and arranged to control the operation of the complementary heater 64 in response to the measured temperature in the regeneration air, e.g. to steplessly control the amount of heat effect added from the complementary heater 64 to the regeneration air flow.

The heat pump shown in FIG. 2 can be replaced by the heat pump shown in FIG. 1 and vice versa.

The complementary regeneration air moisture removal system 26 shown in FIG. 2 can be replaced by the complementary regeneration air moisture removal system 26 shown in FIG. 1 and vice versa.

The regeneration air heat bypass system 28 shown in FIG. 2 can be replaced by the regeneration air heat bypass system 28 shown in FIG. 1 and vice versa.

Figure 3:
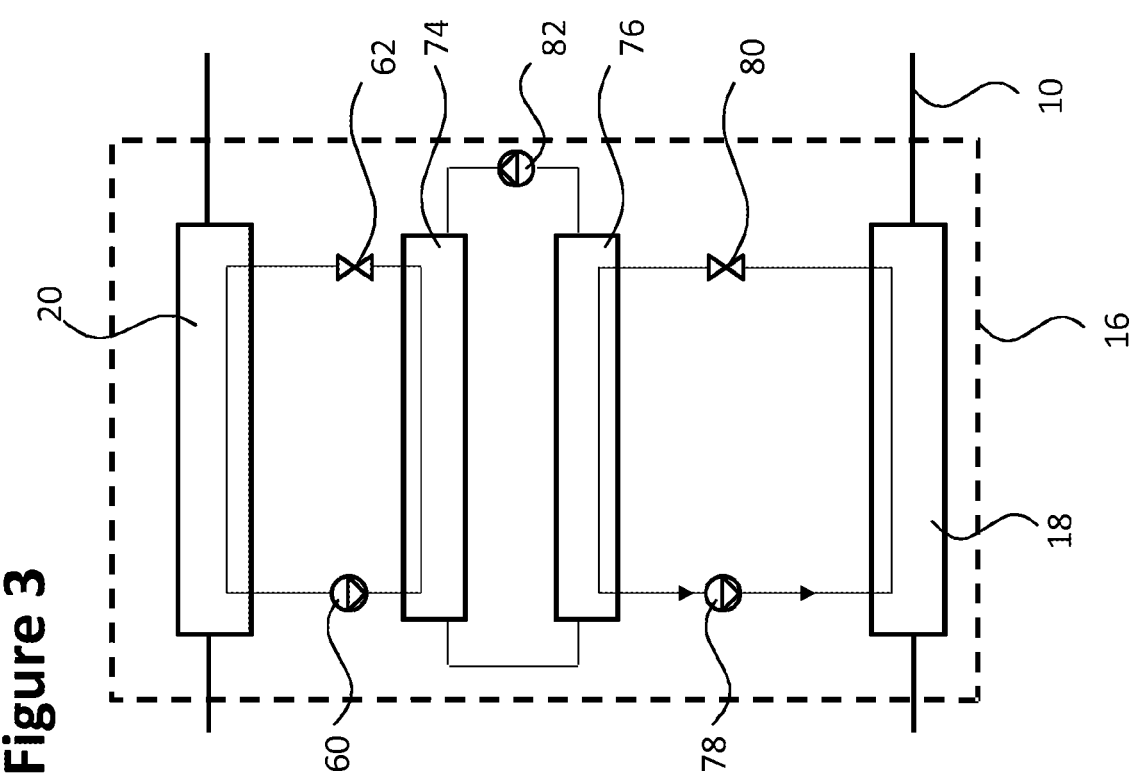
FIG. 3 shows schematically a further embodiment of a heat pump according to the invention, and FIG. 4 schematically a yet further embodiment of a heat pump according to the invention.

FIG. 3 shows schematically a further embodiment of a heat pump 16 according to the invention comprising an evaporator 20 and a condenser 18. The heat pump shown in FIG. 1 or FIG. 2 can be replaced by the heat pump shown in FIG. 3. The heat pump in FIG. 3 differs from the heat pump shown in FIG. 2 in that the heat pump in FIG. 3 is a two-step heat pump comprising an additional condenser 74 and an additional evaporator 76 and multiple compressors 60, 78 and expansion valves 62, 80, and a circulation pump 82 arranged to circulate fluid.

Figure 4:
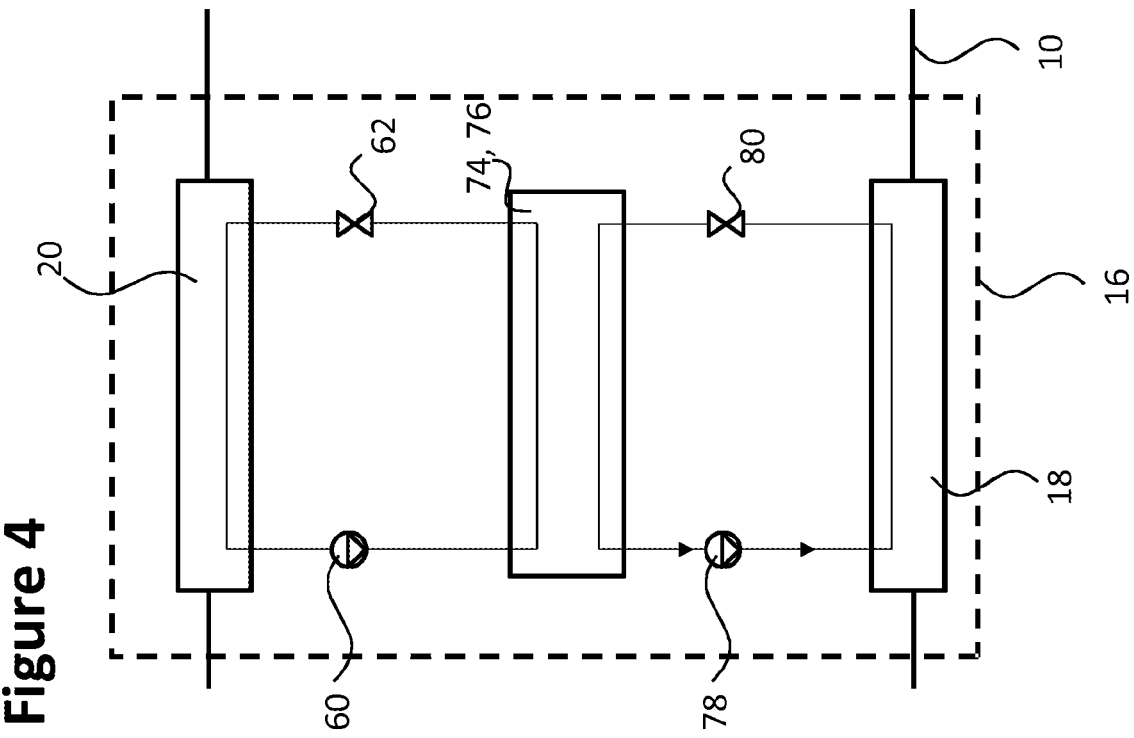

FIG. 4 shows schematically a yet further embodiment of a heat pump 16 according to the invention comprising an evaporator 20 and a condenser 18. The heat pump shown in FIG. 1 or FIG. 2 can be replaced by the heat pump shown in FIG. 4. The heat pump in FIG. 4 differs from the heat pump shown in FIG. 2 in that the heat pump in FIG. 4 is a two-step heat pump comprising an additional condenser 74 and an additional evaporator 76 and multiple compressors 60, 78 and expansion valves 62, 80.

Referring now to FIGS. 1 to 4:

It is advantageous for a heat pump 16 to be operated at as constant operating conditions as possible as this allows for the possibility to design the heat pump for optimal process performance at specific constant operating conditions.

According to the invention, in order to achieve as constant operating conditions as possible for the heat pump 16, the temperature of the outlet regeneration air 32 is regulated depending on the moisture content of the regeneration air that has been has been dehumidified in the evaporator 20 by condensation, and remaining excess moisture is removed from the regeneration air downstream of the evaporator 20 if necessary.

Thus, the heat pump can operate at constant operating conditions even if the temperature of and the moisture content of the process air varies over time.

Further, the regeneration air 24 is run in a closed regeneration air loop 10. The closed loop configuration increases the moisture content in the closed regeneration air loop 10. One important aspect of the invention is the closed loop configuration of the regeneration air loop. By having a closed loop, the regeneration air can be kept in saturated condition in the loop except from the part between the condenser and the dehumidifier unit 4. As the temperature decreases, the amount of water vapor in the air needed to reach saturation also decreases.

In operation, the evaporator 20 of the heat pump 16 condenses the moisture present in the wet outlet regeneration air 32 and the condenser 18 of the heat pump 16 returns heat energy at an elevated temperature to heat the inlet regeneration air 30. Due to the large amount of latent heat available at the high moisture ratios in the closed loop, the risk of the heat pump freezing is lower which makes the regeneration system less sensitive to cold environments and thus more robust in operation. This increased robustness makes it possible to utilize the major part of the waste heat in the regeneration air and for the condenser 18 of the heat pump 16 to increase the temperature of the inlet regeneration air 30 more than a heat pump having an open loop configuration for the regeneration air flow.

With the above mentioned closed loop configuration for the regeneration air flow, the heat pump capacity is to be designed for a case where the heat pump operating hours are high and where the heat pump is able to condense the moisture collected by the dehumidifier unit 4 from inlet process air with high humidity. The heat pump 16, possibly in cooperation with complementary regeneration process equipment such as e.g. a moisture removal system for removal of excess moisture from regeneration air and a heat bypass system for heat exchange between inlet regeneration air and outlet regeneration air, will then be able to handle cases where the inlet process air has varying humidity.

The regeneration system is adapted to cope with seasonal variations of the process air, e.g. seasonal variations of the kind found in the nordic countries such as Sweden.

Another important aspect of the invention is the complementary regeneration process equipment.

In order to be able to provide the heat pump with as constant operating conditions as possible, the regeneration system has three operation modes A, B and C.

A: The first operation mode A is chosen when the dehumidifier unit process air dewatering rate requires more heat than the design capacity of the heat pump. In this operation mode, the evaporator 20 in the heat pump 16 is not able to condense all of the the moisture that is removed from the inlet process air stream by the dehumidifier unit 4, the excess moisture not removed by the evaporator 20 remains in the regeneration air downstream of the evaporator 20. In this operation mode, this excess moisture is removed from the regeneration air before the regeneration air enters the condenser 18 in the heat pump 16. This removal of excess moisture is done using an excess moisture removal system.

One way of removing this excess moisture is to use an excess moisture removal system comprising at least one air ventilation outlet 40 and at least one supply air inlet 38. Regeneration air containing excess moisture is then ventilated out of the regeneration air loop via the at last one air ventilation outlet 40 arranged downstream of the evaporator 20 and upstream of the condenser 18. The ventilated air is replaced by supply air entered into the regeneration air loop via at least one supply air inlet arranged downstream of the evaporator 20 and upstream of the at least one air ventilation outlet 38. Another way of removing this excess moisture is to use an additional cooler downstreams of the evaporator 20, e.g. a sub-cooler in the heat pump.

B: The second operation mode B is chosen when the dehumidifier unit process air dewatering rate requires the heat equal to the design capacity of the heat pump. In this operation mode, all of the moisture that is removed from the inlet process air stream by the dehumidifier unit 4 is condensed by the evaporator 20 in the heat pump 16, with optimal process performance by the heat pump. Thus, no excess moisture remains in the regeneration air downstream of the evaporator 20 in the heat pump 16.

It is to be noted that the design capacity of the heat pump depends on the operation range of the heat pump and can vary within an interval or a range if the heat pump comprises a compressor and if the rotational speed of the compressor in the heat pump can be varied within an interval or a range, i.e. if the heat pump has a turn-down ratio.

C: The third operation mode C is chosen when the dehumidifier unit process air dewatering rate requires less heat than the design capacity of the heat pump. In this operation mode, the capacity of the heat pump is higher than the heat demand needed to regenerate the moisture absorbing agent in the dehumidifier unit 4 if the outlet regeneration air 32 from the dehumidifier unit 4 is entered into the evaporator 20 without any modifications of the temperature or the moisture content of the outlet generation air. If no modifications of the temperature or moisture content are made, the evaporator 20 in the heat pump 16 will condensate more moisture than necessary from the regeneration air, i.e. more moisture that has been removed from the inlet process air stream by the dehumidifier unit 4. To balance this unnecessary condensation of moisture from the regeneration air, heat is lead via a heat bypass, i.e. a bypass heat stream, thus heating the outlet regeneration air with heat from the inlet regeneration air stream. In this way, the heat pump can be run at a constant rate and the amount of condensate formed in the evaporator 20 can be kept equal to the amount of humidity removed from the process air stream by the dehumidification unit.

Regarding the design capacity of the heat pump which can vary within an interval or a range if the rotational speed of the compressor in the heat pump can be varied within an interval or a range, i.e. if the heat pump has a turn-down ratio:

If, for example, the operating rotational speed of the compressor can be within a range of 20%-100% of the maximum rotational speed of the compressor, operating mode A is used if a rotational speed for the compressor of more than 100% of the maximum rotational speed of the compressor would be required in operating mode B, and operating mode C is used if a rotational speed of less than 20% of the maximum rotational speed of the compressor would be required in operating mode B.

In order to shift between the above three operating modes A, B and C, the dehumidification system comprises a control system and sensors, where moisture and temperature sensors detect the temperature and the moisture content of regeneration air, and where the control system in response to this input controls regulating devices such as heat bypass pump and dampers for supply air inlet flow and air ventilation outlet flow. The control system can comprise a central control unit or a number of separate control units each controlling one or several regulating devices.

By being able to switch between the above three operating modes A, B and C, the heat pump operating time can be maximized as the heat pump can operate at constant conditions even in varying process air conditions. The robustness of the operating conditions for the heat pump makes it possible to run the heat pump most of the available operating hours of the year and thereby electrical energy is saved compared to running a direct heater or a conventional heat pump heater.

A dehumidification method of dehumidifying process air by a dehumidification system according to the invention thus comprises the steps of:

operating the dehumidification system with an activated complementary regeneration air moisture removal system 26 and a de-activated regeneration air heat bypass system 28 when the dehumidifier unit process air dewatering rate requires more heat than the design capacity of the heat pump, and operating the dehumidification system with a de-activated complementary regeneration air moisture removal system 26 and an activated regeneration air heat bypass system 28 when the dehumidifier unit process air dewatering rate requires less heat than the design capacity of the heat pump, and can further comprise the step of:

operating the dehumidification system with a de-activated complementary regeneration air moisture removal system 26 and a de-activated regeneration air heat bypass system 28 when the dehumidifier unit process air dewatering rate requires the heat equal to the design capacity of the heat pump.

As mentioned above, the design capacity of the heat pump can vary within an interval or a range if the rotational speed of a compressor in the heat pump can be varied within an interval or a range, i.e. if the heat pump has a turn-down ratio.

The goal is to run the heat pump as many operating hours as possible.

In summer conditions with high humidity in the process air, operating mode A would be used. In winter conditions with low humidity in the process air, operating mode C would be used. In areas with seasonal variations in temperature and humidity of the process air, the extent of use of operation mode B depends on the possible turn-down ratio of the heat pump.

In the following, reference is made to FIGS. 1 and 2:

The temperature and the moisture content of the regeneration air varies along the closed regeneration air loop. The temperature of the heat pump refrigerant also varies. The following temperatures are only given to exemplify these differences and the heat exchange between regeneration air and heat pump refrigerant, and are not in any way limiting the invention:

When the regeneration air enters the process air dehumidifier unit 4, it is "dry" and can have a temperature e.g. of about 130° C., preferably of about 90-150° C., more preferably of about 110-130° C., most preferably of about 120-130° C. In the process air dehumidifier, the regeneration air collects moisture from the moisture absorbing agent 6 and is cooled down in the process.

When the regeneration air enters the evaporator in the heat pump, it is "wet" and can have a temperature e.g. of about 40° C.

When the heat pump refrigerant enters the evaporator, it can have a temperature e.g. of about 30° C. In the evaporator, the regeneration air is cooled down by the heat pump refrigerant and moisture is removed from the regeneration air by condensation.

When the heat pump refrigerant enters the condenser, it can have a temperature e.g. of about 120° C.

When the regeneration air enters the condenser in the heat pump, it can have a temperature e.g. of about 25° C.-30° C. In the condenser, the regeneration air is heated by the heat pump refrigerant.

The means for creating a regeneration air flow in the regeneration air loop can e.g. be a regeneration air fan.

The means for creating a regeneration air flow in the regeneration air loop are preferably arranged downstreams of the at least one supply air inlet and upstreams of the at least one air ventilation outlet. By heating the supply air condensation is avoided in the means for creating a regeneration air flow in the regeneration air loop, i.e. e.g. in a regeneration air fan, in case the regeneration air exiting the evaporator has a high moisture content, thus also avoiding condensation and corrosion in the means for creating a regeneration air flow in the regeneration air loop, i.e. e.g. in a regeneration air fan.

The moisture absorbing agent 6 can be a desiccant arranged in a desiccant wheel or desiccant rotor arranged in the process air dehumidifier unit 4. The moisture absorbing agent 6 can be a silica gel.

The invention claimed is:

1. A process air dehumidification system comprising:
    a process air dehumidifier unit comprising a moisture absorbing agent,
    a moisture absorbing agent regeneration system comprising:
        a closed regeneration air loop arranged to pass through the process air dehumidifier unit,
        a regeneration air flow generating means for generating a regeneration air flow in the closed regeneration air loop, and
        a heat pump comprising a condenser, an evaporator and a heat pump refrigerant, wherein the closed regeneration air loop is arranged to pass through the condenser and the evaporator to exchange heat between regeneration air and heat pump refrigerant,
    a complementary regeneration air moisture removal system arranged downstreams of the evaporator and upstreams of the condenser,
    a regeneration air heat bypass system arranged to exchange heat from inlet regeneration air upstreams of the dehumidifier unit and downstreams of the condenser to outlet regeneration air downstreams of the dehumidifier unit and upstreams of the evaporator, and
    means arranged to activate and deactivate the complementary regeneration air moisture removal system and the regeneration air heat bypass system.

2. The dehumidification system according to claim 1, wherein the complementary regeneration air moisture removal system comprises at least one supply air inlet and at least one air ventilation outlet arranged in the closed regeneration air loop, where the at least one supply air inlet is arranged upstream of the at least one air ventilation outlet, and further comprises regulating means for regulating a supply air flow and regulating means for regulating air ventilation flow.

3. The dehumidification system according to claim 2, wherein the regulating means are motor controlled dampers.

4. The dehumidification system according to claim 3, wherein the moisture absorbing agent regeneration system comprises a complementary heater arranged to heat supply air.

5. The dehumidification system according to claim 2, wherein the means arranged to activate and deactivate the complementary regeneration air moisture removal system is a moisture indicator and control device arranged to measure moisture content in the regeneration air flow downstreams of the complementary regeneration air moisture removal system and arranged to control the regulating means in response to the measured moisture content in the regeneration air.

6. The dehumidification system according to claim 5, wherein the moisture absorbing agent regeneration system comprises a complementary heater arranged to heat supply air.

7. The dehumidification system according to claim 2, wherein the moisture absorbing agent regeneration system comprises a complementary heater arranged to heat supply air.

8. The dehumidification system according to claim 1, wherein the moisture absorbing agent regeneration system comprises a complementary heater arranged to heat supply air.

9. The dehumidification system according to claim 8, wherein the means arranged to activate and deactivate the complementary heater is a complementary temperature indicator and control device arranged to measure the temperature of the supply air flow downstreams of the further complementary heater and arranged to control the operation of the complementary heater in response to the measured temperature in the supply air.

10. The dehumidification system according to claim 1, wherein the complementary regeneration air moisture removal system comprises at least one sub-cooler where the closed regeneration air loop is arranged to pass through the sub-cooler.

11. The dehumidification system according to claim 10, wherein the means arranged to activate and deactivate the complementary regeneration air moisture removal system is a moisture indicator and control device arranged to measure moisture content in the regeneration air flow downstreams of the complementary regeneration air moisture removal system and arranged to activate or de-activate the sub-cooler in response to the measured moisture content.

12. The dehumidification system according to claim 1, wherein the regeneration air heat bypass system comprises a heat exchanger for heat absorbation from inlet regeneration air and a heat exchanger for discharge to outlet regeneration air, a closed refrigerant loop connecting the heat exchangers, a refrigerant and a refrigerant pump.

13. The dehumidification system according to claim 12, wherein the means arranged to activate and deactivate the complementary regeneration air heat bypass system is a temperature indicator and control device arranged to measure temperature of the regeneration air flow downstreams of the evaporator and arranged to control the operation of the refrigerant pump in response to the measured temperature.

14. The dehumidification system according to claim 1, wherein the regeneration air heat bypass system comprises a heat exchanger arranged for heat absorbation from inlet regeneration air and for heat discharge to outlet regeneration air where said heat exchanger is arranged in the closed regeneration air loop downstreams of the dehumidifier unit and where an inlet regeneration air bypass loop is arranged to pass through said heat exchanger, where further dampers in the inlet regeneration air bypass loop and in the closed regeneration air loop are arranged to control the amount of regeneration air flow through the inlet regeneration air bypass loop.

15. The dehumidification system according to claim 1, wherein the moisture absorbing agent regeneration system comprises a complementary heater arranged to heat regeneration air downstreams of the condenser and upstreams of the dehumidifier unit.

16. The dehumidification system according to claim 15, wherein the means arranged to activate and deactivate the complementary heater is a complementary temperature indicator and control device arranged to measure the temperature of the regeneration air flow downstreams of the complementary heater and arranged to control the operation of the complementary heater in response to the measured temperature.

17. The dehumidification system according to claim 1, wherein the heat pump comprises at least a compressor and an expansion valve.

18. A method of dehumidifying process air by the dehumidification system according to claim 1, wherein the dehumidification method comprises the steps of:
  operating the dehumidification system with an activated complementary regeneration air moisture removal system and a de-activated regeneration air heat bypass system when the dehumidifier unit process air dewatering rate requires more heat than the design capacity of the heat pump, and
  operating the dehumidification system with a de-activated complementary regeneration air moisture removal system and an activated regeneration air heat bypass system when the dehumidifier unit process air dewatering rate requires less heat than the design capacity of the heat pump.

19. The method of dehumidifying process air according to claim 18, wherein the dehumidification method further comprises the step of: operating the dehumidification system with a de-activated complementary regeneration air moisture removal system and a de-activated regeneration air heat bypass system when the dehumidifier unit process air dewatering rate requires the heat equal to the design capacity of the heat pump.

20. The dehumidification system according to claim 3, wherein the means arranged to activate and deactivate the complementary regeneration air moisture removal system is a moisture indicator and control device arranged to measure moisture content in the regeneration air flow downstreams of the complementary regeneration air moisture removal system and arranged to control the regulating means in response to the measured moisture content in the regeneration air.

* * * * *